Patented Aug. 24, 1954

2,687,390

UNITED STATES PATENT OFFICE 2,687,390

VINYL CHLORIDE POLYMER PLASTICIZED WITH 2-(2-ETHYLHEXYLOXY) ETHYL-n-BUTYL PHTHALATE

Joachim Dazzi, Dayton, Ohio, assignor to Monsanto Chemical Company, St. Louis, Mo., a corporation of Delaware No Drawing. Original application August 25, 1951, Serial No. 243,754, now Patent No. 2,661,367, dated December 1, 1953. Divided and this application May 27, 1953, Serial No. 357,930

5 Claims. (Cl. 260—31.4)

The present invention provides 2-(2-ethylhexyloxy)ethyl n-butyl phthalate as a new compound, a method of producing the same, and vinyl chloride polymers plasticized with the phthalate.

2-(2-ethylhexyloxy)ethyl n-butyl phthalate may be prepared by condensing the mono-2-ethylhexyl ether of ethylene glycol with the mono-n-butyl ester of phthalic acid or the mono-acid chloride thereof. The new mixed ester may also be prepared by condensing mono-2-(2-ethylhexyloxy)ethyl phthalate or the mono-acid chloride thereof with n-butanol.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition, such as low volatility, color and heat stability, water absorption, etc.

Esters of phthalic acid have been generally suggested for use as softening agents for polymeric vinyl compounds. However, the softening of vinyl chloride polymers presents peculiar problems in that plasticizers which are compatible with other vinyl polymers, e. g., the polyvinyl acetals, the polyacrylates or the polyvinyl carboxylates are often incompatible with vinyl chloride polymers or are readily exuded therefrom when present in quantities sufficient to bring about the desired degree of flexibility. I have now found, however, that 2-(2-ethylhexyloxy)-ethyl n-butyl phthalate is of outstanding value as a plasticizer for vinyl chloride polymers, this ester serving not only to soften vinyl chloride polymers, but also to impart simultaneously a high degree of low temperature flexibility, very good temperature stability and great mechanical strength to these polymers. The present ester shows no exudation even at plasticizer content of up to 50 per cent. Although the quantity of plasticizer will depend upon the particular polymer to be plasticized and upon its molecular weight, it is generally found that compositions having from 5 per cent to 50 per cent by weight of the present plasticizer will, in most cases, be satisfactory for general utility. The good flexibility of the plasticized compositions increases with increasing plasticizer concentration.

In evaluating plasticizer efficiency use is made of the following empirical procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions' usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

The invention is further illustrated, but not limited, by the following examples:

Example 1

A mixture consisting of 52.2 g. (0.3 mole) of 2-(2-ethylhexyloxy)ethanol, 30.8 g. of dry pyridine and 120 g. of dry ether was cooled, with stirring, to 0° C., and at this temperature, during 38 minutes, there was added a mixture of 0.3 mole of n-butyl phthalyl monochloride. The resulting reaction mixture was maintained for 3 hours at 0° C., and diluted with ether. After washing out the pyridine salt which had formed, the residue was distilled to give the substantially pure 2-(2-ethylhexyloxy)ethyl n-butyl phthalate, B. P. 200° C.–210° C. at 1–2 mm., $n_D^{25}$ 1.4835, having a saponification equivalent of 181.3 (calcd. S. E.=189).

*Example 2*

Sixty parts of polyvinyl chloride and 40 parts by weight of the 2-(2-ethylhexyloxy)ethyl n-butyl phthalate were worked on a rolling mill to a homogeneous blend. During the milling there was observed substantially no fuming and discoloration. The molded sheet of the mixture was clear and transparent and substantially colorless. Testing of the molded sheet for low temperature flexibility, according to the testing procedure described above, gave a value of minus 41° C. which value denotes good low temperature properties. Tests on the volatility characteristics of the plasticized composition gave a value of 8.9 per cent. The plasticized material had a hardness of 71 before the volatility test and a hardness of 71 after the volatility test. When subjected to heat at a temperature of 325° F. for a period of 30 minutes the clarity and color of the molded product was substantially unchanged.

While the above example shows only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present ester is compatible with polyvinyl chloride over wide ranges of concentrations, up to 50 per cent of ester based on the total weight of the plasticized composition yielding desirable products.

Although the invention has been described particularly with reference to the use of 2-(2-ethylhexyloxy)ethyl n-butyl phthalate as a plasticizer for polyvinyl chloride, this ester is advantageously employed also as a plasticizer for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present ester is substantially unreactive with the commercially available heat and light stabilizers which are commonly employed with polyvinyl chloride or copolymers thereof, the presence of such materials in the plasticized products does not impair the valuable properties of the present ester. 2-(2-ethylhexyloxy)ethyl n-butyl phthalate is of general utility in softening vinyl polymers. It may be used as the only plasticizing component in a compounded vinyl chloride polymer or it may be used in conjunction with other plasticizers.

This application is a division of my copending application, Serial No. 243,754, filed August 25, 1951, now Patent Number 2,661,367.

What I claim is:

1. A resinous composition comprising a vinyl chloride polymer plasticized with 2-(2-ethylhexyloxy)ethyl n-butyl phthalate.

2. A resinous composition comprising polyvinyl chloride plasticized with 2-(2-ethylhexyloxy)-ethyl n-butyl phthalate.

3. A resinous composition comprising polyvinyl chloride plasticized with 2-(2-ethylhexyloxy)-ethyl n-butyl phthalate, said phthalate being from 5 to 50 per cent of the weight of the composition.

4. A resinous composition comprising a copolymer of at least 70 per cent by weight of vinyl chloride and up to 30 per cent by weight of an unsaturated monomer copolymerizable therewith, said copolymer being plasticized with 2-(2-ethylhexyloxy)ethyl n-butyl phthalate.

5. A resinous composition comprising a copolymer of at least 70 per cent by weight of vinyl chloride and up to 30 per cent by weight of an unsaturated monomer copolymerizable therewith, said copolymer being plasticized with 2-(2-ethylhexyloxy)ethyl n-butyl phthalate, said phthalate being from 5 to 50 per cent of the weight of the composition.

No references cited.